(12) United States Patent
Nelson et al.

(10) Patent No.: US 6,587,121 B1
(45) Date of Patent: Jul. 1, 2003

(54) GRAPHICAL TABLE OF CONTENTS FOR A HELP SYSTEM

(75) Inventors: Grant T. Nelson, Wyoming, MN (US); Robert J. Gambrel, Spring Lake Park, MN (US)

(73) Assignee: Unisys Corporation, Blue Bell, PA (US)

(*) Notice: Subject to any disclaimer, the term of this patent is extended or adjusted under 35 U.S.C. 154(b) by 674 days.

(21) Appl. No.: 08/994,617

(22) Filed: Dec. 19, 1997

(51) Int. Cl.[7] ................................................ G06F 3/14
(52) U.S. Cl. ....................... 345/705; 345/853; 345/854; 345/855; 345/841
(58) Field of Search ................................ 345/356, 338, 345/357, 334, 335, 339, 853, 855, 854, 841, 810, 705, 713, 714, 764; 395/338

(56) References Cited

U.S. PATENT DOCUMENTS

| | | | | |
|---|---|---|---|---|
| 5,034,899 A | * | 7/1991 | Schult | 345/441 |
| 5,287,448 A | * | 2/1994 | Nicol et al. | 345/336 |
| 5,301,301 A | * | 4/1994 | Kodosky et al. | 345/356 |
| 5,550,967 A | * | 8/1996 | Brewer et al. | 345/336 |
| 5,581,670 A | | 12/1996 | Bier et al. | 395/326 |
| 5,581,684 A | | 12/1996 | Dudzik et al. | 395/338 |
| 5,581,686 A | | 12/1996 | Koppolu et al. | 395/340 |
| 5,584,035 A | | 12/1996 | Duggan et al. | 395/800 |
| 5,600,779 A | * | 2/1997 | Palmer et al. | 345/340 |
| 5,673,403 A | * | 9/1997 | Brown et al. | 345/335 |
| 5,675,782 A | * | 10/1997 | Montague et al. | 707/9 |
| 5,715,415 A | * | 2/1998 | Dazey et al. | 345/338 |
| 5,801,702 A | * | 9/1998 | Dolan et al. | 345/356 |
| 5,825,355 A | * | 10/1998 | Palmer et al. | 345/336 |
| 5,838,910 A | * | 11/1998 | Domennikos et al. | 345/335 |

OTHER PUBLICATIONS

Microsoft Word for Windows 95, Version 7.0, Copyright 1983–1995 Microsoft Corporation.
Micron Help, Version 1.1G, Copyright 1996, Micron Electronics, Inc.
Microsoft Windows 95, Copyright 1981–1995, Microsoft Corporation.

* cited by examiner

*Primary Examiner*—Kristine Kincaid
*Assistant Examiner*—Thomas T. Nguyen
(74) *Attorney, Agent, or Firm*—Charles A. Johnson; Mark T. Starr; Nawrocki, Rooney & Sivertson PA

(57) ABSTRACT

Method and apparatus for providing a user customizable help system for a data processing environment which utilizes a graphical interface to identify solutions and/or topics of interest. This graphical help system displays partitioned groupings of help topics organized in a intuitively functional, positional manner such that a user will instinctively know where to find the desired help topic. These partitioned groupings of help topics preferably represent hardware platforms, operating environments, application groupings, or groupings of functions within an application. Further, and within each of the partitioned groupings, the invention contemplates providing multiple "views" of help topics, each "view" corresponding to a different type of user of the data processing system. By providing multiple views, the help system can be easily tailored to better address differences in experience, sophistication, and job requirements between widely disparate users of the same data processing system.

40 Claims, 6 Drawing Sheets

GRAPHICAL TABLE OF CONTENTS FOR A HELP SYSTEM

CROSS REFERENCES TO CO-PENDING APPLICATIONS

The present application is related to U.S. patent application Ser. No. 08/852,654, filed May 7, 1997, entitled "Multi-Platform Helper Utilities", U.S. patent application Ser. No. 08/852,509, filed May 7, 1997, entitled "User Assistance for Data Processing Systems", and U.S. patent application Ser. No. 08/852,654, filed May 7, 1997, entitled "Method and Apparatus for Providing a Hyperlink within a Computer Program That Access Information Outside of the Computer Program", all of which are assigned to the assignee of the present invention and incorporated herein by reference.

BACKGROUND OF THE INVENTION

1. Field of the Invention

This invention relates to data processing systems, and more particularly to data processing systems having user assistance resources.

2. Description of the Prior Art

It is known to provide documentation for the purpose of permitting a user to operate a data processing system. With the earliest data processing systems, this documentation often took the form of user manuals that described the operation and utilization of the corresponding data processing system. While proving somewhat useful, a large set of hard copy manuals for a complete computer and set of corresponding applications are often quite voluminous, making the task of finding a solution to even a simple question difficult. Further, hard copy manuals typically require a large amount of physical space, are expensive to buy, and demand significant human resource to maintain and keep current.

As systems were designed to be more interactive, it became common to provide user documentation within the data processing system hardware and software itself. A first step in this evolutionary process was to simply provide electronic versions of the previously available hard copy manuals. The electronic manuals were typically divided into groups including those that were dedicated to the computer system itself (hardware manuals), those that were dedicated to the computer operating system (systems manuals), and those that were dedicated to the application programs (application manuals). Providing the manuals in electronic form addresses some of the problems of the earlier hard copy manuals, including reducing acquisition and maintenance costs and allowing users in remote locations to access the manuals directly via their computer system.

While these electronic user manuals provide some advantages over the hard copy manuals, a number of problems remain. Like the hard copy manuals, the electronic user manuals typically only included an index and a table of contents. Some limitations of the table of contents/index approach include: the user seeking help must know exactly what words or phrases to use when seeking help, and the list of available topics in the table of contents/index still may be very large, thus limiting the speed and precision with which a user is able to obtain the assistance the user seeks. Some electronic manuals include a keyword search capability, and more sophisticated electronic manuals include hyperlinks between related sectors.

The above problems are more acute when dealing with multi-platform computing environments. Today, multi-platform systems are widely in use. In such a system, a user's application program may reside on one computer system, the user's data may reside on another computer system, while the user may be running the application from yet a third computer system. A user at a personal workstation may not even know on which computer system their application is running, much less where to look for help information relating to the application.

Furthermore, today's distributed, multi-platform computer systems can present unique problems of moving information between computer systems. User manuals for a particular computer system often do not contemplate the types of system-to-system configurations and interactions that multi-platform users face. Such interoperability issues are often completely outside the scope of all of the user documentation.

SUMMARY OF THE INVENTION

The present invention overcomes many of the disadvantages associated with the prior art by providing a user customizable help system for a data processing environment which utilizes a graphical interface to identify solutions and/or topics of interest. This graphical help system displays partitioned groupings of help topics organized in a intuitively functional, positional manner such that a user will instinctively know where to find the desired help topic.

These partitioned groupings of help topics may represent hardware platforms, operating environments, application groupings, or groupings of functions within an application. Within each of the partitioned groupings, the invention contemplates providing multiple "view types" of help topics. In an illustrative embodiment, "view types" correspond to different types of users of the data processing system. It is contemplated that other embodiments of the "view type" concept might include view type groupings for data manipulation (printing, storage, and removal) or applications (middleware, tools and utilities). By providing multiple views, the help system can be easily tailored to better address differences in experience, sophistication, and job requirements between widely disparate users of the same data processing system.

In one illustrative embodiment of the present invention, two "view" selections are provided. The first selection corresponds to a "system view" and the second selection corresponds to a "user view". The "system view" might be used by a computer system administrator or application developer, while the "user view" might be activated by a general user of the data processing system.

The "system view" of the illustrative embodiment preferably contains help topic pushbuttons that are graphically partitioned by groupings (such as computer hardware platforms, computer operating environments, sets of applications, or functions within a particular application) which will provide help on topics of specific interest to system administrators such as setting file access permissions, user passwords, or diagnostic utilities.

The "user view" preferably contains help topic pushbuttons that are graphically partitioned by groupings (such as computer hardware platforms, computer operating environments, sets of applications, or functions within a particular application) which will provide help on topics of specific interest to general system users such as using electronic mail, a database management system, a spreadsheet, or file transfer utilities. Thus, the present invention can be a carefully tailored, graphical alternative to a standard table of contents, allowing for a more intuitive approach to finding topics of interest for distinct classes of users.

In another embodiment of the present invention, a system and methodology for implementing user assistance functions for users of data processing systems having multiple computer operating environments is contemplated. Preferably, a user is presented with a one screen graphical overview of the entire data processing environment, logically partitioned into functional units. Within each functional unit, the help topics most relevant to the type of user requesting the help information are presented. As an example, the screen of help topics might be graphically partitioned into groups representing a OS 2200 environment, a UnixWare environment, a Windows NT environment, and a Personal Computer Workstation Windows 95 operating environment. This graphically tailored, partitioned approach to presentation of help topics is more intuitive than a text based table of contents approach. The system may also provide user assistance functions concerning interoperability of diverse applications, whether hosted on the same computer platform or hosted on different computer platforms.

In another illustrative embodiment, the help system has one or more screens of user selectable help topics. These help topics are graphically partitioned into two or more groups of topics corresponding to hardware platforms within the data processing system. As an example, the screen of help topics might be graphically partitioned into groups representing a UNISYS 2200 mainframe computer, a local file server computer, a desktop personal computer, and a laptop computer.

In another illustrative embodiment, the present invention graphically partitions one or more screens of user selectable help topics into groups of topics corresponding to sets of applications within the data processing system. As an example, the screen of help topics might be graphically partitioned into groups representing an office suite of applications such as Microsoft Office 97, or an internet toolkit containing applications such as a web browser, HTML toolkit, JAVA toolkit, and an E-mail application.

In yet another illustrative embodiment, the present invention groups one or more screens of user selectable help topics by functional blocks of a selected computer application. Preferably, the functional blocks are interrelated via a functional diagram. This functional diagram may include interconnections between the functional blocks which indicate topographical relationships between the functional blocks in the application. These topographical relationships may identify an ordered, positionally relevant set of functional topics, graphically displayed in such a manner that an application user may know intuitively where to seek help for an application subtask. An example of such a functional diagram might be Microsoft Excel, with functional blocks corresponding to importing/exporting files, worksheets, charts, file management, printing, and using macros. The help topic pushbuttons within the groupings provide access points to corresponding help information. The help information may reside in a dedicated help database, a universal help database, etc.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
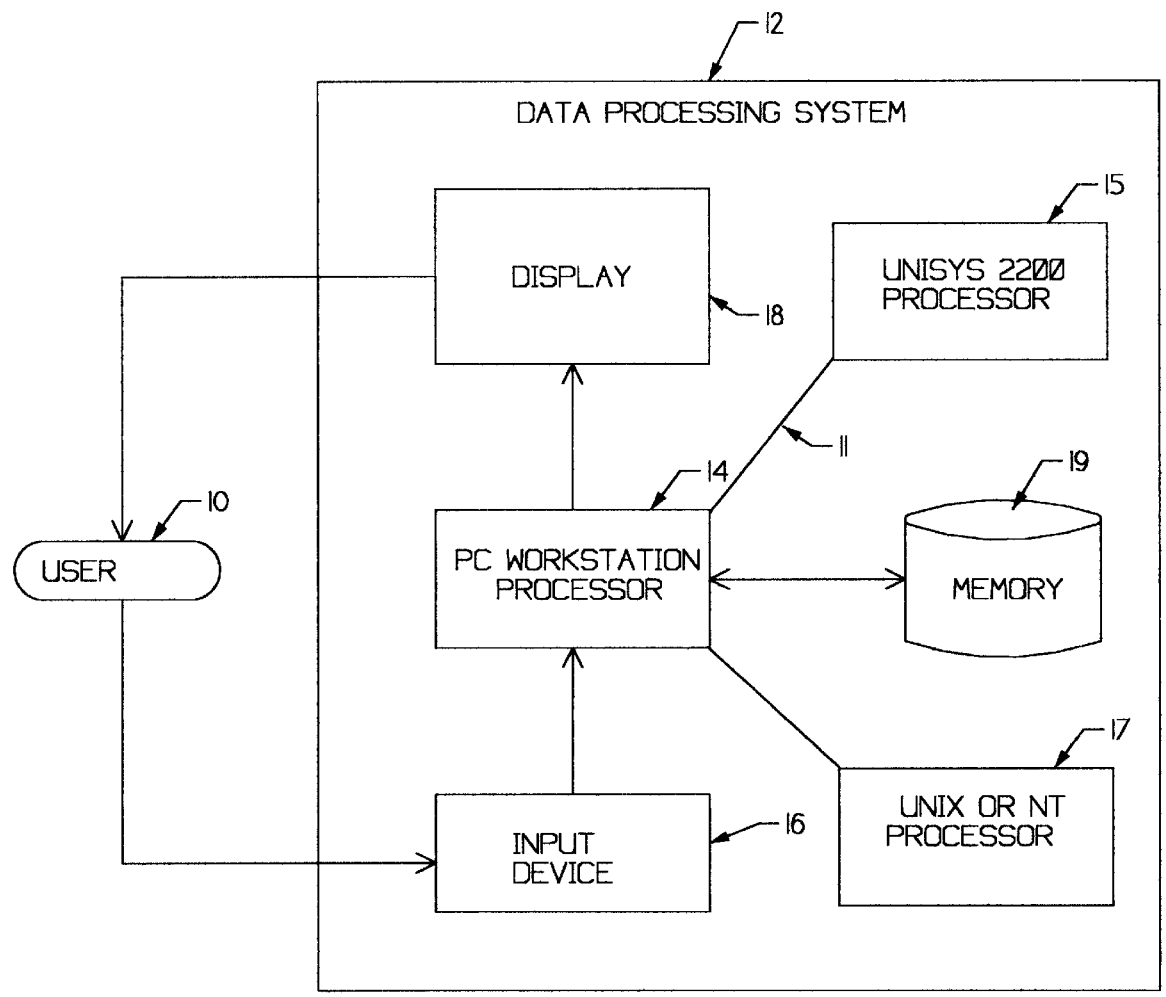
FIG. 1 is a block diagram of the computer-based environment of the present invention.

The detailed descriptions which follow are presented largely in terms of algorithms and symbolic representations of operations of data bits within a computer memory. These algorithmic descriptions and representations are the means used by those skilled in the data processing arts to most effectively convey the substance of their work to others skilled in the art.

An algorithm is here, generally, conceived to be an self-consistent sequence of steps leading to a desired result. These steps are those requiring physical manipulations of physical qualities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer system or other apparatus. In particular, various general purpose computer systems may be used with computer programs written in accordance with the teachings of the present invention, or it may prove more convenient to construct. more specialized apparatus, to perform the required method steps. This required structure for such machines will be apparent from the description given below.

In sum, the present invention preferably is implemented for practice by a computer, e.g., a source code expression of the present invention is input to the computer to control operations therein. It is contemplated that a number of source code expressions, in one of many computer languages, could be utilized to implement the present invention. A variety of computer systems can be used to practice the present invention, including, for example, a personal computer, an engineering work station, an enterprise server, etc. The present invention, however, is not limited to practice on any one particular computer system, and the selection of a particular computer system can be made for many reasons.

FIG. 1 is a block diagram of the computer-based environment of the present invention. A user 10 interacts with a data processing system 12 to perform a number of computer based tasks. The data processing system includes one or more processors 14, which execute operating system software as well as application programs. The processor 14 is found in all general purpose computers and almost all special purpose computers.

In a preferred embodiment, the data processing system consists of multiple processors 14, 15, and 17 interconnected through a local area network 11. In this embodiment, the user will mainly interact with a personal computer workstation utilizing a processor 14 having an Intel architecture, running the Windows 95 operating environment. The personal computer workstation, may in turn, be networked to one or more of the following: a Unisys 2200 mainframe computer running OS 2200 15, a server running Microsoft Windows NT (not shown), and/or a server running the UNIX operating system 17.

The user 10 enters information into the data processing system 12 by using a well-known input device 16 such as a mouse, keyboard, or a combination of the two devices. It should be understood, however, that the input device 16 may actually consist of a card reader, magnetic or paper tape reader, or other well-known input device (including another computer system). A mouse or other cursor control device is typically used as an input device 16 as a convenient means to input information to the data processing system 12 to select command modes, edit input data, and the like. Visual feedback of the currently active computer process is given to the User 10 though a textual or graphical representation on a display 18. Such a display 18 may take the form of any of several well-known varieties of CRT displays. The application or other operating software being executed by the processor 14 stores information relating to the currently executing procedure in memory 19. The memory 19 may take the form of a semiconductor memory, magnetic disks, optical disk, magnetic tape or other mass storage devices.

Figure 2:
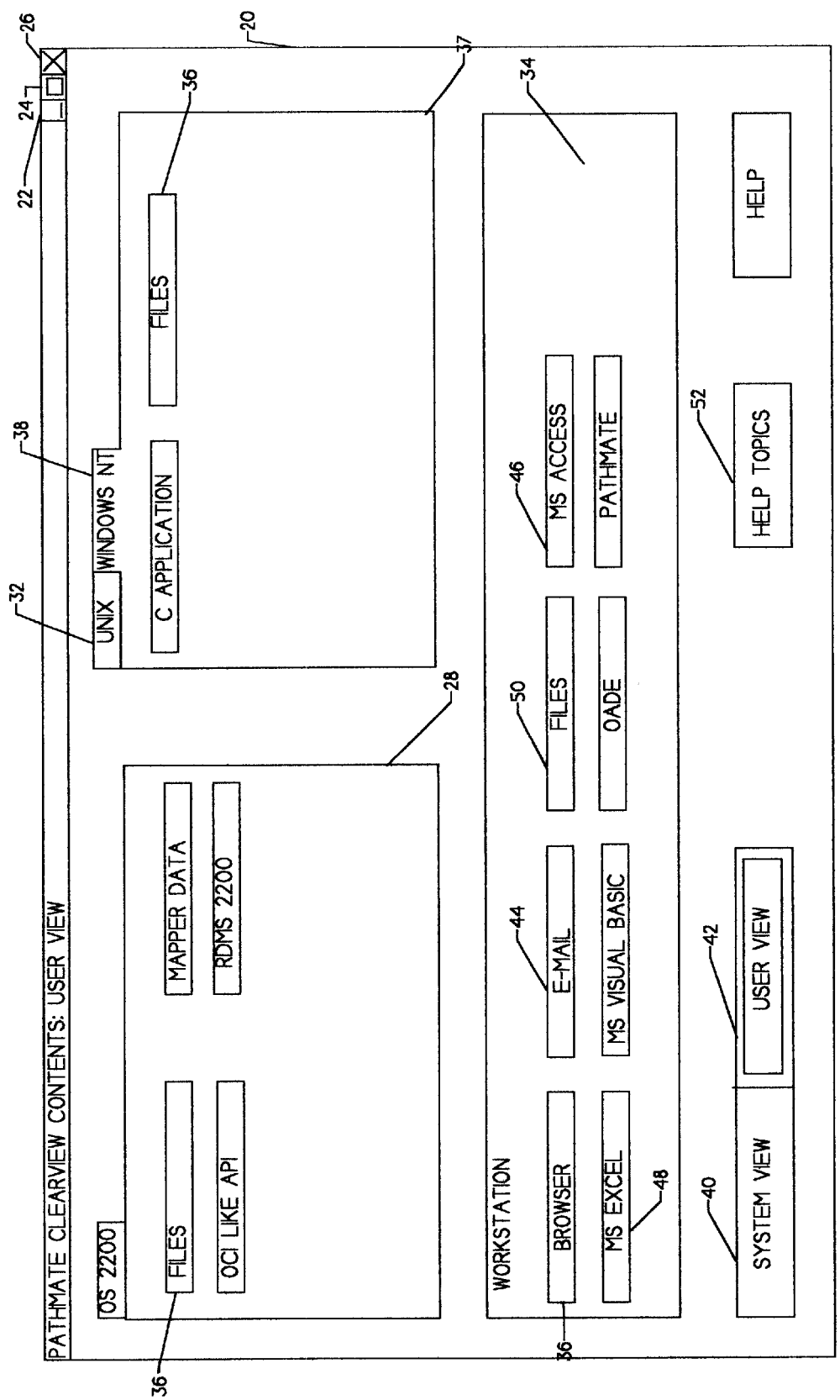
FIG. 2 is a block diagram of a preferred embodiment of the present invention wherein help topics are partitioned by operating environment, and the user view is selected.

FIG. 2 is a block diagram of a preferred embodiment of the present invention wherein help topics are partitioned by computer operating environment, and the user view is selected. In this embodiment, the data processing system illustrated is the CLEARPATH HMP IX system, commercially available from the Unisys Corporation, combining Unisys 2200 and UNIX or Windows NT operating environments and a industry compatible desktop computer running the Microsoft Windows 95 or NT workstation operating environment.

The graphical help system will display one or more screens of user selectable help topics 20 at a personal computer workstation. In this illustrated embodiment, the graphical help system is a Microsoft Windows 95 application program residing and executing on a personal computer workstation. In other embodiments, the graphical help system can reside and/or execute on other hardware platforms or operating environments.

Preferably, the standards established for Windows applications are utilized, including: a minimize window pushbutton 22, a restore window pushbutton 24, and a close window pushbutton 26.

The overview screen of help topics 20 is further partitioned into groupings of help topics corresponding to computer operating environments within the data processing system. In this embodiment, the groupings include the UNISYS OS 2200 operating environment 28, the Windows NT operating environment 38, the UnixWare operating environment 32, and the Windows personal computer workstation operating environment 34. The UNISYS OS 2200 operating environment 28 and UnixWare or Windows NT operating environment 32 are coupled via a Fiber Distributed Data Interface (FDDI). The UNISYS OS 2200 operating environment 28 and UnixWare or Windows NT operating environment 32 or 38 are coupled to the Windows NT operating environment 30 and Windows personal computer workstation operating environment 34 via an external LAN. These hardware and software elements, along with supporting documentation, are incorporated herein by reference.

Within each of the operating environment groupings 28, 32, 34, and 38, there are user selectable help topic pushbuttons 36 which link to a displayable help topic information screen when the pushbutton 36 is activated. In the illustrated embodiment, the pushbutton will link to UNISYS PathMate help topics, but other embodiments may also link to application help systems, or even a browsable internet web site (see co-pending Unisys U.S. patent application Ser. No. 08/852,654, filed May 7, 1997, entitled "Method and Apparatus for Providing a Hyperlink within a Computer Program That Access Information Outside of the Computer Program").

Operating environment groupings such as elements 32 and 38 may sometimes overlap each other on the overview screen 20. In the illustrated embodiment, the Windows NT operating environment help topic display area 37 is in the display foreground, overlapping a large portion of the help topic display area for the UnixWare operating environment 32 (currently non-visible in the display background). To allow for this situation, each of the operating environment groupings may contain a grouping label 32 and 38 which is always displayed. To bring a non-visible portion of a help topic display area 37 from the background to the foreground, a user simply has to position a screen pointer over the grouping label 38 or help topic display area 37 portion of the operating environment grouping and click a mouse button.

The overview screen 20 may also include a help topics pushbutton 52. When a user activates this pushbutton 52, the overview screen 20 closes and a help topics window with Contents, Index, and Find tabs is opened.

The illustrated embodiment also includes user selectable pushbuttons for a system view 40 and a user view 42. This feature allows different types of users to have different sets of help topics available within a shared set of operating environment groupings. FIG. 2 illustrates a screen of help topics 20 partitioned into groupings of operating environments 28, 32, 34 and 38 wherein help topics 36 are tailored to a general user of the data processing system. Such help topic pushbuttons 36 might provides help on using E-mail 44, a database system such as Microsoft Access 46, a spreadsheet such as Microsoft Excel 48, or file management utilities 50.

Figure 3:
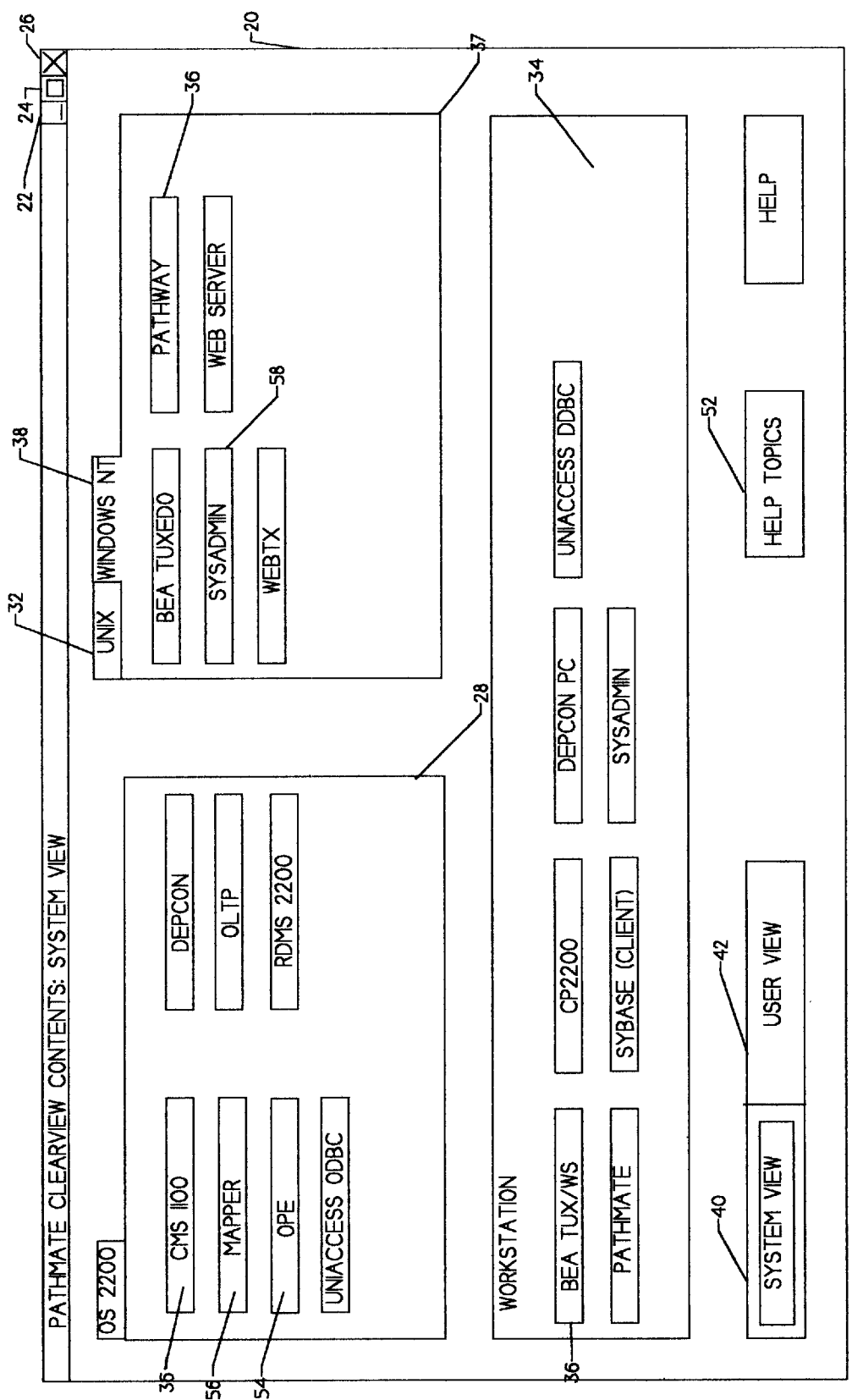
FIG. 3 is a block diagram of a preferred embodiment of the present invention wherein help topics are partitioned by operating environments, and the system view is selected.

FIG. 3 is a block diagram of a preferred embodiment of the present invention wherein help topics are partitioned by operating environments 28, 32, 34 and 38, and the system view pushbutton 42 is selected. In this system view, help topics 36 are tailored to a generally more sophisticated system user of the data processing system (such as a system administrator or applications developer), rather than a general user view, as illustrated in FIG. 2. In all other material respects, FIG. 2 and FIG. 3 are similar.

Help topic pushbuttons in the system view might provide assistance on configuring the Open Programming Environment (OPE) 54, the mapper pushbutton 56 might provide assistance in transferring a copy of a MAPPER report over electronic mail, or the SysAdmin pushbutton 58 may provide help on managing user id's, password and file protection utilities.

Figure 4:
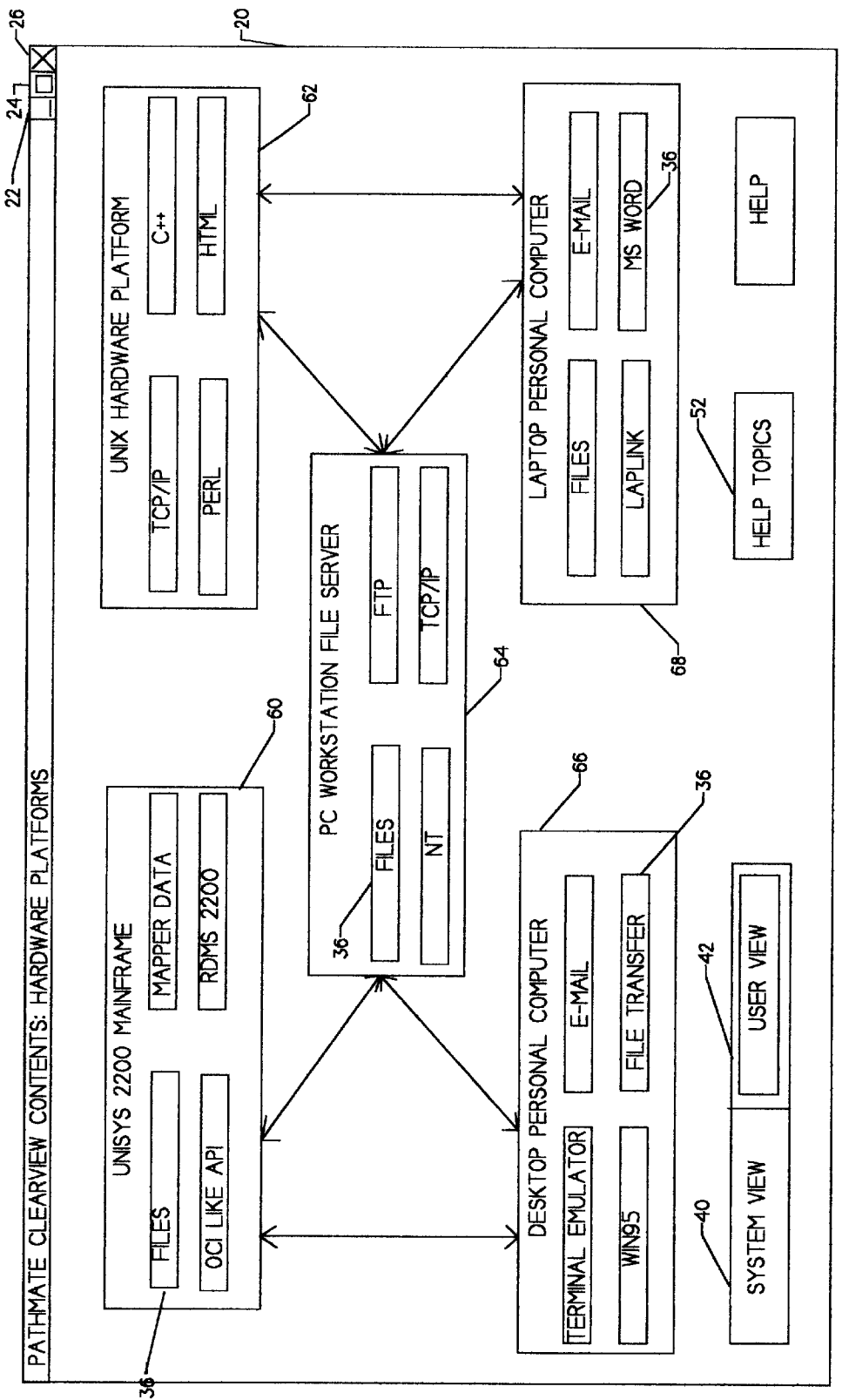
FIG. 4 is a block diagram of a preferred embodiment of the present invention wherein help topics are partitioned by hardware platform.

FIG. 4 is a block diagram of a preferred embodiment of the present invention wherein help topics are partitioned by hardware platform. The graphical help system displays one or more screens of user selectable help topics 20 at a personal computer workstation. In this illustrated embodiment of the present invention, the graphical help system is a Microsoft Windows 95 application program residing and executing on a personal computer workstation, and preferably, conforms to standards established for Windows applications, incorporating such features as a minimize window pushbutton 22, a restore window pushbutton 24, and a close window pushbutton 26.

The screen of help topics 20 is further partitioned into groupings of help topics corresponding to computer hardware platforms residing within the data processing system. In this embodiment, groupings are shown for the model 2200 large scale mainframe hardware platform 60, commercially available from UNISYS Corporation, a UNIX hardware platform 62, also commercially available from UNISYS Corporation, a Windows NT server hardware platform 64, a desktop personal computer hardware platform 66, and a laptop personal computer platform 68. The 2200 platform 60 is coupled to the UNIX platform 62 via an internal local area network (LAN) or FDDI. The 2200 platform 60 and UNIX platform 62 are coupled to the file server platform 64 and the personal computer hardware platform 68 via an external LAN or FDDI connection. These hardware and software elements, along with supporting documentation, are incorporated herein by reference.

Within each of the hardware platform groupings 60, 62, 64, 66, and 68, there are user selectable help topic pushbuttons 36 which link to a displayable help topic information screen when the pushbutton 36 is activated. In the illustrated embodiment, the pushbuttons may link to UNISYS PathMate help topics, but other embodiments may also link to application help systems, or even a browsable internet web site.

The overview screen 20 may also include a help topics pushbutton 52. When a user activates this pushbutton 52, the overview screen 20 closes and a help topics window with Contents, Index, and Find tabs is opened.

The illustrated embodiment also includes user selectable pushbuttons for a system view 40 and a user view 42. This feature allows different types of users to have different sets of help topics available within a shared set of hardware platform groupings.

Figure 5:
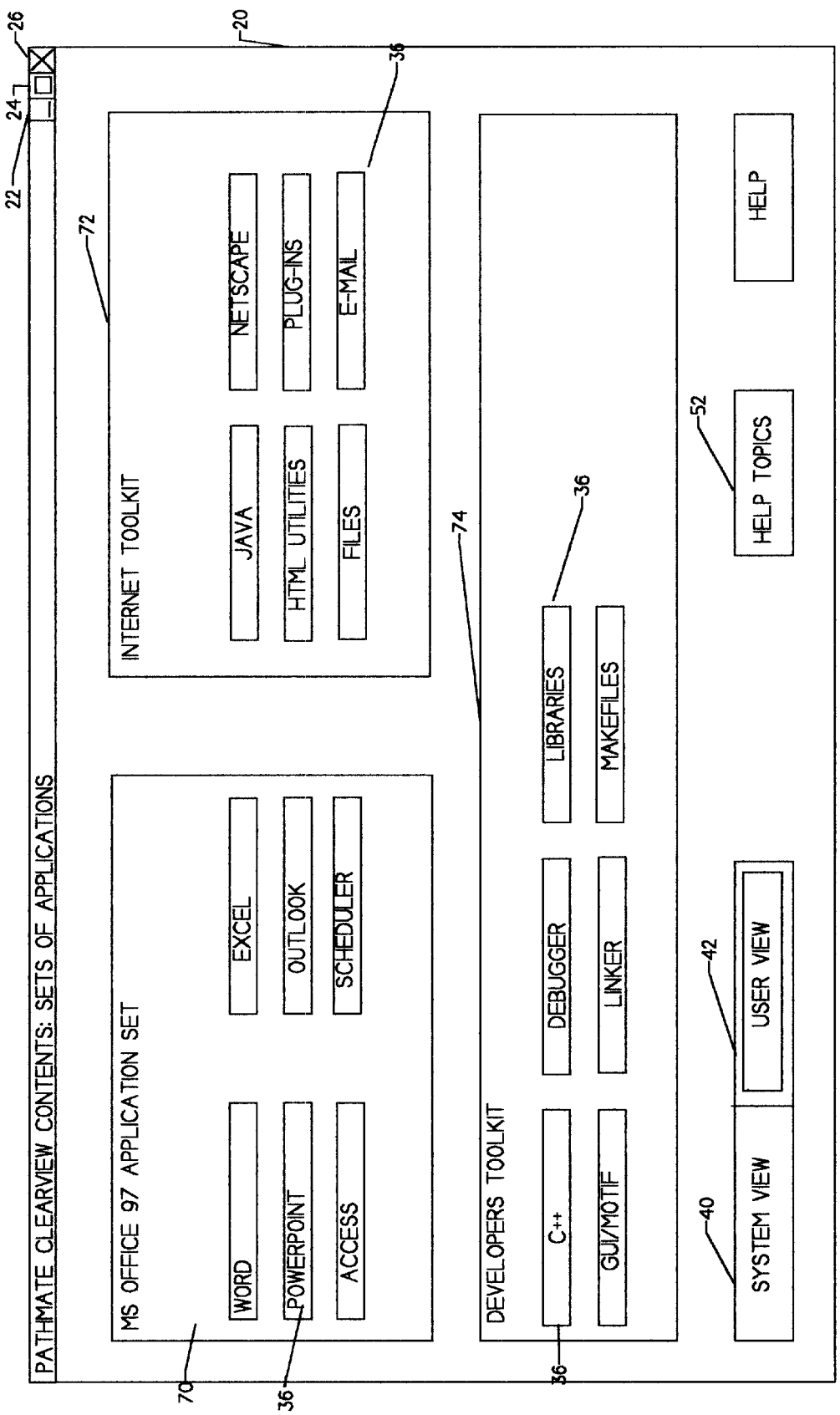
FIG. 5 is a block diagram of a preferred embodiment of the present invention wherein help topics are partitioned by sets of applications.

FIG. 5 is a block diagram of a preferred embodiment of the present invention wherein help topics are partitioned by sets of applications. The graphical help system displays one or more screens of user selectable help topics 20 at a personal computer workstation. In this illustrated embodiment of the present invention, the graphical help system is a Microsoft Windows 95 application program residing and executing on a personal computer workstation, and preferably conforms to standards established for Windows applications, incorporating such features as a minimize window pushbutton 22, a restore window pushbutton 24, and a close window pushbutton 26.

The screen of help topics 20 is further partitioned into groupings of help topics corresponding to sets of computer applications within the data processing system. In this embodiment, there are groupings shown for the Microsoft Office 97 application set 70, an internet toolkit application set 72, and a developer's toolkit application set 74.

Within each of the application set groupings 70, 72 and 74, there are user selectable help topic pushbuttons 36 which provide a displayable help topic information screen when -the pushbutton 36 is activated. In the illustrated embodiment, the pushbuttons may provide link to UNISYS PathMate help topics, but other embodiments may also provide access to application help systems, or even a browsable internet web site.

The overview screen 20 may also include a help topics pushbutton 52. When a user activates this pushbutton 52, the overview screen 20 closes and a help topics window with Contents, Index, and Find tabs is opened.

The illustrated embodiment also includes user selectable pushbuttons for a system view 40 and a user view 42. This feature allows different types of users to have different sets of help topics available within a shared set of application program groupings.

Figure 6:
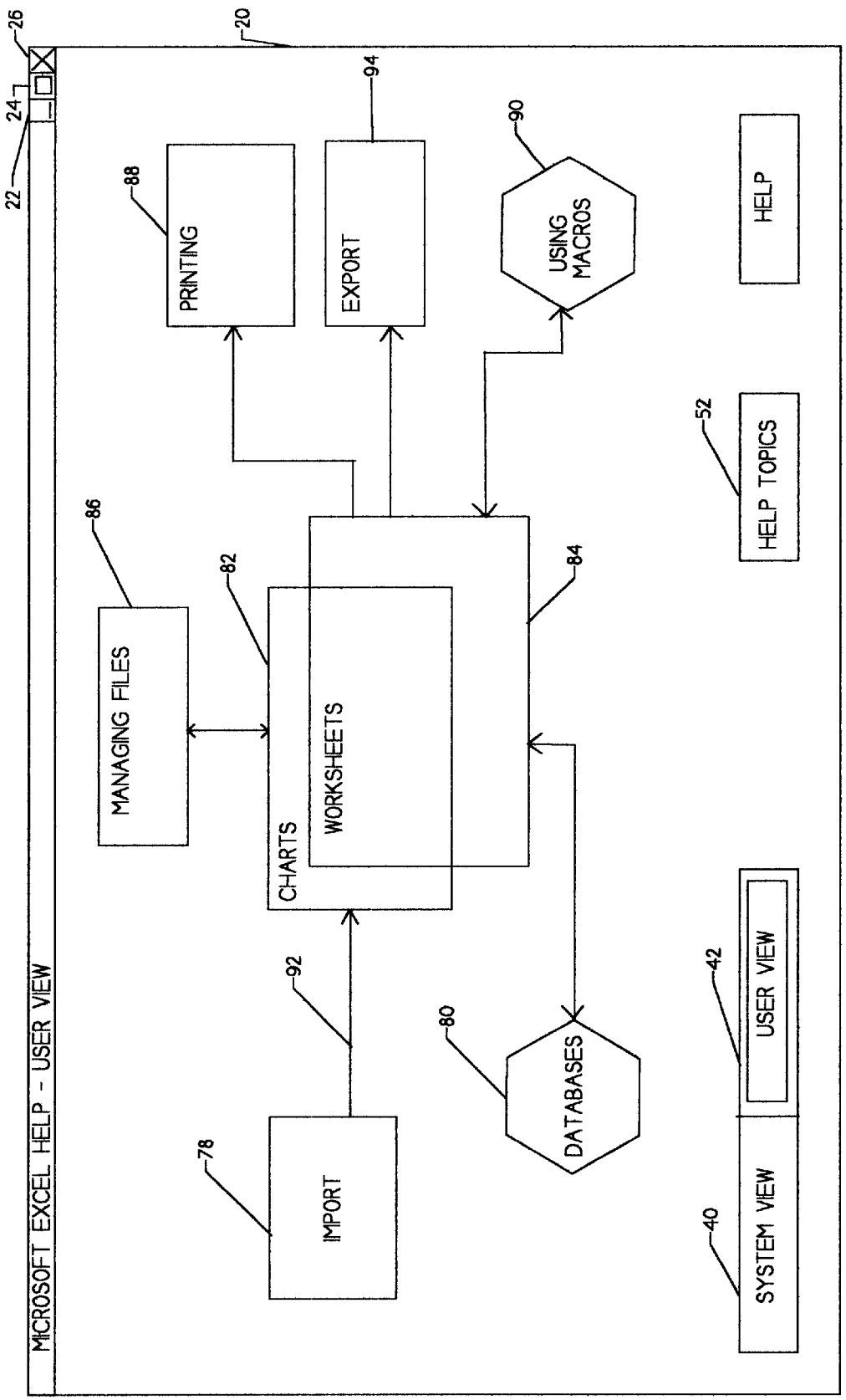
FIG. 6 is a block diagram of a preferred embodiment of the present invention wherein help topics are partitioned by functional blocks within an application.

FIG. 6 is a block diagram of a preferred embodiment of the present invention wherein help topics are partitioned by functional blocks within an application. The graphical help system will display one or more screens of user selectable help topics 20 at a personal computer workstation. In this illustrated embodiment of the present invention, the graphical help system is a Microsoft Windows 95 application program residing and executing on a personal computer workstation, and preferably, conforms to standards established for Windows applications, incorporating such features as a minimize window pushbutton 22, a restore window pushbutton 24, and a close window pushbutton 26.

The screen of help topics 20 is further partitioned into functional groupings within a computer application residing within the data processing system. In this embodiment, there are functional groupings shown for the Microsoft Office 97 Excel spreadsheet application 76, such as: an import functional block 78, a database functional block 80, a charting functional block 82, a worksheet functional block 84, a file management functional block 86, a printing functional block 88, a macro functional block 90, and an export functional block 94.

This functional diagram of a computer application includes interconnections 92 between the functional blocks 76, 78, 80, 82, 84, 86, 88 and 90 which indicate topographical relationships between the functional blocks in the application. These topographical relationships will break an application down into a ordered, positionally relevant set of functional topics, graphically displayed in such a manner that an application user will know intuitively where to seek help for an application subtask. As an example, in the illustrated embodiment, the import functional block 78 is positioned to the left of the charting and worksheet functional blocks 82 & 84, while the printing and export functional blocks 88 & 94 are positioned to the right of the charting and worksheet functional blocks 82 & 84. This topographically ordered, left-to-right arrangement of functional blocks and associated help topics will not only allow a user to easily locate assistance materials, but will also provide the user with an ordered, "roadmap" to both the organization and use of the computer application.

Within each of the functional groupings 78, 80, 82, 84, 86, 88, and 90, there are user selectable help topic pushbuttons 36 which preferably link to a displayable help topic information screen when the pushbutton 36 is activated. In the illustrated embodiment, the pushbuttons may link to UNISYS PathMate help topics, but other embodiments may also provide access to application help systems, or even a browsable internet web site.

The overview screen 20 may also include a help topics pushbutton 52. When a user activates this pushbutton 52, the overview screen 20 closes and a help topics window with Contents, Index, and Find tabs is opened.

The illustrated embodiment also includes user selectable pushbuttons for a system view 40 and a user view 42. This feature allows different types of users to have different sets of help topics available within a shared set of application functional block groupings.

Having thus described the preferred embodiment of the present invention, those of skill in the art will readily appreciate the many additional embodiments which may be implemented using the teachings found herein and within the scope of the claims hereto attached.

What is claimed is:

1. In a data processing system having at least one computer hardware platform and at least one computer operating environment, the improvement comprising:
    a graphical help system having a number of selected help topics including two or more sets of help topics wherein each said set of help topics corresponds to a view type;
    selection means for allowing the user to select the view type; and
    display means coupled to said selection means for displaying help topics corresponding to the selected view type.

2. A data processing system according to claim 1 wherein said view type corresponds to a user type.

3. A data processing system according to claim 2 wherein said graphical help system comprises one or more screens of user selectable help topics.

4. A data processing system according to claim 1 wherein said graphical help system is a computer application residing and executing on a user workstation.

5. A data processing system according to claim 1 wherein at least one of the computer hardware platforms is a user workstation, and at least a portion of said graphical help system describes at least one of the hardware platforms other than said user workstation.

6. A data processing system according to claim 4 wherein said user workstation utilizes the Microsoft Windows 95 operating environment and said graphical help system operates as a Microsoft Windows 95 application.

7. A data processing system according to claim 4 wherein said user workstation utilizes the NT workstation operating environment and said graphical help system operates as a NT workstation application.

8. A data processing system according to claim 3 wherein said screen is graphically partitioned into two or more groupings of said user selectable help topics, each of said groupings corresponding to one or more of the computer hardware platforms.

9. A data processing system according to claim 3 wherein said screen is graphically partitioned into two or more groupings of user selectable help topics, each of said groupings corresponding to one or more of the computer operating environments.

10. A data processing system according to claim 9 wherein said screen is a graphical representation of a UNISYS ClearPath HMP IX system having a first grouping corresponding to an OS 2200 operating environment, a second grouping corresponding to a UnixWare environment, a third grouping corresponding to a Windows NT environment, and a fourth grouping corresponding to a Microsoft Windows 95 workstation environment.

11. A data processing system according to claim 9 wherein said screen is a graphical representation of a UNISYS ClearPath HMP IX system having a first grouping corresponding to an OS 2200 operating environment, a second grouping corresponding to a UnixWare environment, a third grouping corresponding to a Windows NT environment, and a fourth grouping corresponding to a Microsoft NT workstation environment.

12. A data processing system according to claim 10 wherein said first grouping is positioned generally in a left portion of said screen, said second grouping is positioned generally in a right portion of said screen, said third grouping is positioned generally in a right portion of said screen, and said fourth grouping is positioned generally in a bottom portion of said screen.

13. A data processing system according to claim 12 wherein each of said second grouping and said third grouping have an overlapping help topic display area and a non-overlapping grouping label such that said user must select one of said grouping labels to bring the corresponding said help topic display area to the displayable foreground.

14. A data processing system according to claim 3 wherein said screen is graphically partitioned into two or more groupings of user selectable help topics, each of said groupings corresponding to a set of computer applications.

15. A data processing system according to claim 3 wherein said screen is graphically partitioned into two or more groupings of user selectable help topics, each of said groupings corresponding to a function or set of functions within a computer application.

16. A data processing system according to claim 3 wherein said user selectable help topics are represented on said screen by a pushbutton having a label corresponding to said user selectable help topic.

17. A data processing system according to claim 16 wherein said pushbutton is linked to a PathMate help topic pertaining to the environment described by the pushbutton's location and label such that when said pushbutton is depressed, one or more screens of help information is displayed.

18. A data processing system according to claim 3 wherein said screen further comprises a help topic pushbutton to display a help topics window.

19. A data processing system according to claim 18 wherein said help topics window further comprises a contents tab with an associated first display area, an index tab with an associated second display area, and a find tab with an associated third display area.

20. A data processing system having at least two computer hardware platforms, the improvement comprising:
    a help system having graphical means for displaying information relevant to the operation of the data processing system, wherein said graphical means provides a display partitioned into two or more groupings of help topics, each said grouping associated with a display area, and each said grouping corresponding to one of said computer hardware platforms.

21. A data processing system according to claim 20 wherein said graphical means further comprises a help topic pushbutton to display a help topics window.

22. A data processing system according to claim 21 wherein said help topics window further comprises a contents tab with an associated first display area, an index tab with an associated second display area, and a find tab with an associated third display area.

23. A data processing system according to claim 20 wherein said display means comprises one or more screens of user selectable help topics.

24. A data processing system according to claim 23 having one or more views of said selectable help topics, each said view tailored to a particular user or group of users of the data processing system.

25. A data processing system according to claim 24 wherein said view is selectable by a pushbutton displayed on said screen.

26. A data processing system having at least two computer operating environments, the improvement comprising:
 a help system having graphical means of displaying information relevant to the operation of the data processing system, wherein said graphical means provides a display partitioned into two or more groupings of help topics, each said grouping associated with a display area, and each said grouping corresponding to one of said computer operating environments.

27. A data processing system according to claim 26 wherein said graphical means further comprises a help topic pushbutton to display a help topics window.

28. A data processing system according to claim 26 wherein said help topics window further comprises a contents tab with an associated first display area, an index tab with an associated second display area, and a find tab with an associated third display area.

29. A data processing system according to claim 26 wherein said display means comprises one or more screens of user selectable help topics.

30. A data processing system according to claim 29 having one or more views of said selectable help topics, each said view tailored to a particular user or group of users of the data processing system.

31. A data processing system according to claim 30 wherein said view is selectable by a pushbutton on said screen.

32. A data processing system according to claim 30 wherein said screen is a graphical representation of a UNISYS ClearPath HMP IX system having a first grouping corresponding to an OS 2200 operating environment, a second grouping corresponding to a UnixWare environment, a third grouping corresponding to a Windows NT environment, and a fourth grouping corresponding to a Microsoft Windows 95 environment.

33. A data processing system according to claim 30 wherein said screen is a graphical representation of a UNISYS ClearPath HMP IX system having a first grouping corresponding to an OS 2200 operating environment, a second grouping corresponding to a UnixWare environment, a third grouping corresponding to a Windows NT environment, and a fourth grouping corresponding to a Microsoft NT workstation environment.

34. A data processing system according to claim 32 wherein said first grouping is positioned generally in a left portion of said screen, said second grouping is positioned generally in a right portion of said screen, said third grouping is positioned generally in a right portion of said screen, and said fourth grouping is positioned generally in a bottom portion of said screen.

35. A data processing system according to claim 34 wherein both said second grouping area and said third grouping area each have an overlapping help topic display area and a non-overlapping grouping label such that said user must select one of said grouping labels to bring the corresponding said help topic display area to the displayable foreground.

36. In a data processing system having at least one computer application:
 a graphical help system for the computer application comprising a functional diagram of the computer application, including a number of functional blocks, whereby selected functional blocks comprise access points to help information regarding the function.

37. The data processing system of claim 36, whereby said functional diagram includes interconnections between said functional blocks to indicate topographical relationships between said functional blocks.

38. The data processing system of claim 36, whereby said help information access points link to PathMate topics.

39. The data processing system of claim 36, whereby said help information access points link to selected topics within said computer application help system.

40. The data processing system of claim 36, whereby said help information access points link to associated internet web sites accessible through an internet browser.

* * * * *